Dec. 1, 1970     P. E. LESKINEN     3,544,433
CLAD PRESSING DIE OR PLASTIC MATERIAL FOR PRESSING SHEET METAL
Filed Dec. 13, 1967

PAUL ENSIO LESKINEN
INVENTOR.

BY *Albert M. Parker*

ATTORNEY.

United States Patent Office 3,544,433
Patented Dec. 1, 1970

3,544,433
CLAD PRESSING DIE OR PLASTIC MATERIAL FOR PRESSING SHEET METAL
Paul Ensio Leskinen, Vittnesgranden 11,
Lund 5, Sweden
Filed Dec. 13, 1967, Ser. No. 690,142
Claims priority, application Sweden, Jan. 27, 1967,
1,198/67
Int. Cl. C23b 5/60
U.S. Cl. 204—20
2 Claims

ABSTRACT OF THE DISCLOSURE

A press die for pressing sheet metal into a desired shape has a plastic body covered by a protective cap of sheet metal, the surface of which cap is formed in the desired die shape. The cap is reinforced by a layer of heat conducting metal disposed between it and the plastic body. The conducting layer is thicker than the sheet metal of the cap and the total thickness of the cap and conducting layer is greater than the thickness of the sheet metal to be pressed.

---

Figure 1:

The present invention is concerned with press dies for use in connection with pressing sheet metal, the dies being made substantially of plastic and the shaping surface thereof being capped or clad with a shell of sheet metal (protective plate), which has been pressed to conform to the contour of the shaping surface of the die and serves to protect the plastic material against wear.

Hitherto, dies of this type have been produced by first molding the die from plastic, to a shape of the pressing surface which differs from the shape of the finished die, by the thickness of the protective plate. By means of the non-clad pressing surface such a plate is then pressed from sheet metal, to a shape conforming with the shape of said surface; the sheet metal being of such thickness that pressing can be effected without causing damage to the un-clad die body. With this plate on its place the die is now ready for pressing heavy sheet metal. It is possible in this manner to produce dies for pressing complicated shapes much more cheaply than by milling the molding or pressing surface of the die in a metallic base material. The term "plastic" as used herein means "a synthetic resinous material." The use of dies having plastic bodies and sheet metal caps is well known and any of the plastics conventionally used in such dies and any of the metals used for sheet metal caps for the plastic die bodies are suitable for use in the present invention.

However, in spite of the relatively high inherent mechanical strength of the plastics conventionally used in clad dies this type of die of plastic is less suitable for use in pressing operations requiring deformation processing to a high degree, even though such deformation is limited locally. It has been found that, in the case of pressing operation requiring high degree deformation of the workpiece, the section of the plastic immediately adjacent the protective plate which is subject to a particularly heavy deformation against the pressing or moulding surface will tend to disintegrate, owing to the generation of heat in the vicinity thereof. Hitherto, this factor has greatly resricted the uility of such a die.

However, the inventor has discovered that the reason for this unfavourable effect is the very low thermal capacity of the thin protective plate and its very slight ability to distribute locally applied heat rapidly to the rest of the protective plate, which causes a very high heating of both the protective plate and the plastic in the vicinity thereof, i.e. at all sections where the workpiece is deformed to the highest degree. This could be remedied, by using a considerably thicker protective plate, but to produce such as plate by a corresponding increase in plate thickness is not possible within the frame of the above described simple method of manufacturing the die.

The present invention provides a different solution of the above problem and is mainly characterized in that the protective plate, which is thinner than the plate to be pressed, is plated or covered on the face thereof facing the plastic material with a coating or layer of heat conducting layer of metallic, by means of metallization, the thickness of the coating being greater than that of the protective plate and of such a magnitude that the protective plate and the layer or coating together form a cap or shell which is thicker than the sheet metal to be pressed.

Thus, this method of manufacturing the die according to the invention, wherein the heat conducting layer has the same heat distributing effect as a corresponding increase in the thickness of the protective plate proper, will result in such an effect without increasing the thickness of the protective plate. As a consequence, such a die according to the invention can also be produced by the aforesaid simple method with the added intermediary step of coating the protective plate, which is pressed from sheet metal thinner than the sheet metal to be pressed, with heat conducting layer of metallic material. This can easily be effected by means of spraying or in electrogalvanic way and thus will not cause any problem.

As an example of materials which can be used in spray I may, for instance, mention zinc, copper, steel and metal alloys, and metals such as zinc, copper and nickel can be used when applying the coating in electrogalvanic way.

It has been found that, providing the thickness of such a coating or layer is so much greater than that of the protective plate that the coating and protective cap together are thicker than the sheet metal to be pressed, the coating will provide an effective shield against destructive heating of the plastic from which the die body is made.

Figure 2:
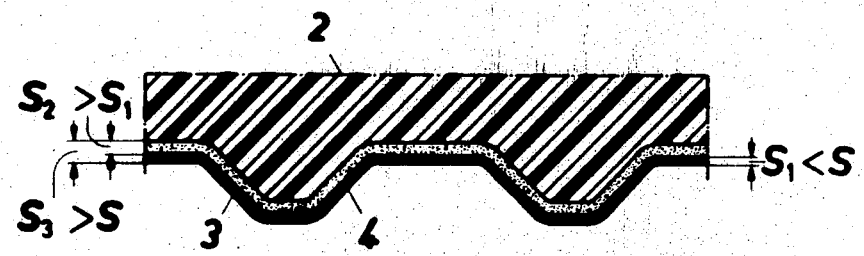

A preferred embodiment of the invention is illustrated by way of example in the accompanying drawing, in which FIG. 1 illustrates a sectional side view of part of a sheet metal to be pressed, and FIG. 2 is a section in side view of a part of a die according to the invention for pressing sheet metal against rubber, for instance.

The sheet metal 1 has a thickness S. The die 2 of plastic is provided with a protective plate 3 the thickness $S_1$ of which is less than thickness S and which is coated on the face facing the plastic with a heat conducting layer of thickness $S_2$ which is greater than $S_1$. The protective plate 3 and coating 4 together form a cap or shell having the thickness $S_3$ which is greater than S.

In this manner the die cap will present a high thermal capacity and high thermal conductivity. Consequently, the heat generated during each pressing operation, by bending and stretching of the material at substantially relatively local positions, will be dispersed rapidly over such a large body that the result will be a moderate heating distributed over large areas of the protective cap; consequently when the cap is exposed between each pressing operation the amount of heat supplied to the pressing force will be absorbed by the surroundings to a sufficient degree to prevent deleterious heating of the plastic of the die body.

Thus, the principal advantage obtained by means of the invention is that because the heating problem has been overcome the utility of said clad or capped dies, which are both relatively simple and inexpensive to produce, will be extended to embrace also pressing operations in which said problem has previously excluded the use of dies of this type.

What I claim is:

1. An arrangement in a press die for shape-pressing sheet metal, said die substantially consisting of a body of plastic and a protective cap of pressed sheet metal for the protection of said body against wear, the protective cap being thinner than sheet metal which the die is adapted to press, said cap being provided by metallization with a heat conductive metal coating on a face thereof facing the body of plastic, the thickness of said coating being greater than that of the protective cap and so great that the protective cap and the coating together form a shell which is thicker than sheet metal which the die is adapted to press.

2. An arrangement in a press die for shape-pressing sheet metal, said die substantially consisting of a body of plastic and a protective cap of pressed sheet metal for the protection of said body against wear, the protective cap being thinner than sheet metal which the die is adapted to press, said cap being provided by electrogalvanization with a heat conductive metal coating on a face thereof facing the body of plastic, the thickness of said coating being greater than that of the protective cap and so great that the protective cap and the coating together form a shell which is thicker than sheet metal which the die is adapted to press.

References Cited

UNITED STATES PATENTS

| 3,097,668 | 7/1963 | Langer | 204—20 X |
| 3,305,460 | 2/1967 | Lacy | 204—20 |
| 3,332,860 | 7/1967 | Diebold et al. | 204—20 X |
| 3,438,226 | 4/1969 | Dalpiaz | 204—20 |
| 3,466,229 | 9/1969 | Whitacre et al. | 204—30 |
| 3,466,232 | 9/1969 | Francis et al. | 204—30 |

PATRICK P. GARVIN, Primary Examiner

C. F. DEES, Assistant Examiner

U.S. Cl. X.R.

204—30